United States Patent

Bergevin

[11] Patent Number: 6,145,248
[45] Date of Patent: *Nov. 14, 2000

[54] SPORTS PLAYING SURFACES WITH BIODEGRADABLE BACKINGS

[75] Inventor: Jerry G. Bergevin, Edmonds, Wash.

[73] Assignee: Turf Stabilization Technologies, Inc., Cincinnati, Ohio

[*] Notice: This patent is subject to a terminal disclaimer.

[21] Appl. No.: 09/110,881

[22] Filed: Jul. 7, 1998

Related U.S. Application Data

[63] Continuation of application No. 08/744,758, Nov. 6, 1996, Pat. No. 5,850,708, which is a continuation-in-part of application No. 08/334,414, Nov. 4, 1994, Pat. No. 5,586,408, which is a continuation of application No. 08/078,624, Jun. 17, 1993, abandoned, which is a continuation-in-part of application No. 07/902,147, Jun. 22, 1992, abandoned.

[51] Int. Cl.[7] .......................... E01C 13/08; E01C 63/00; E01C 7/00; A01G 1/12
[52] U.S. Cl. .......................... 47/58.1; 47/1.01; 47/65.5; 19/144; 423/447.1
[58] Field of Search .................. 47/58.1, 1.01, 47/65.5; 19/144; 423/447.1

[56] References Cited

U.S. PATENT DOCUMENTS

| | | | |
|---|---|---|---|
| 3,446,122 | 5/1969 | Raichle et al. | 94/7 |
| 3,703,786 | 11/1972 | Swan | 47/56 |
| 4,007,556 | 2/1977 | Gluck et al. | 47/56 |
| 4,023,505 | 5/1977 | Robey | 111/1 |
| 4,073,753 | 2/1978 | Hauge | 260/2.3 |
| 4,318,248 | 3/1982 | Muldner | 47/56 |
| 4,462,184 | 7/1984 | Cunningham | 47/58 |
| 4,501,420 | 2/1985 | Dury | 272/3 |
| 4,572,700 | 2/1986 | Mantarro et al. | 404/35 |

(List continued on next page.)

FOREIGN PATENT DOCUMENTS

| | | |
|---|---|---|
| 062 738 | 10/1982 | European Pat. Off. . |
| 0 154 841 | 2/1985 | European Pat. Off. . |
| 0 174 755 | 3/1986 | European Pat. Off. . |
| 0 204 381 | 12/1986 | European Pat. Off. . |
| 0261769A1 | 3/1988 | European Pat. Off. . |

(List continued on next page.)

OTHER PUBLICATIONS

Notts Sport, "Notts Sport Grass Reinforcement Passes Tough Scottish Trials," *Notts Sport News*, Grass Reinforcement Ed., 2 pgs. (1990).

Notts Sport, "Stonehenge Trials Lead to More Orders," *Nott Sport News*, Grass Reinforcement Ed., 2 pgs., (1990).

Safety Play Systems Inc., "The Envelope'Base System," 6 pgs. (1992).

"Grass Finally Grows at Rice Stadium, " *The Salt Lake Tribune*, pp. D–1, 6 (Aug. 28, 1995).

"The Green Grass of Gridirons Begins to Make a Comeback," *The New York Times*, pp. 1, 24 (Sep. 3, 1995).

(List continued on next page.)

*Primary Examiner*—Elizabeth F. McElwain
*Assistant Examiner*—Anne Marie Grünberg
*Attorney, Agent, or Firm*—Wood, Herron, & Evans, L.L.P.

[57] ABSTRACT

A biodegradable playing surface (100) including a synthetic turf base (104) positioned atop a foundation (102) is provided. The synthetic turf base includes an at least partially biodegradable backing (112) having a plurality of openings (116), and synthetic fibers (110) secured to the biodegradable backing. The synthetic turf base also includes a surface layer of growth medium (118) applied on top of the biodegradable backing to reach a predetermined depth. Natural grass (120) is planted in the surface layer of growth medium. The biodegradable backing degrades over time so as to increase the size and number of the openings through the backing. This allows the roots of the natural grass to increasingly grow amongst the synthetic fibers and through the backing, so as to firmly integrate the synthetic turf base to the foundation.

15 Claims, 9 Drawing Sheets

U.S. PATENT DOCUMENTS

| | | | |
|---|---|---|---|
| 4,755,401 | 7/1988 | Friedrich et al. | 428/17 |
| 4,852,870 | 8/1989 | Hawkins et al. | 272/3 |
| 5,014,462 | 5/1991 | Malmgren et al. | 47/1.01 |
| 5,102,482 | 4/1992 | Rogers, Jr. | 156/72 |
| 5,205,068 | 4/1993 | Solomou | 47/55 |
| 5,489,317 | 2/1996 | Bergevin | 47/1.01 |
| 5,586,408 | 12/1996 | Bergevin | 47/1.01 |
| 5,850,708 | 12/1998 | Bergevin | 47/1.01 |

FOREIGN PATENT DOCUMENTS

| | | | |
|---|---|---|---|
| 263566A1 | 4/1988 | European Pat. Off. . | |
| 0 373 282 | 12/1988 | European Pat. Off. . | |
| 0 403 008 | 6/1990 | European Pat. Off. | E01C 13/00 |
| 0 403 008 | 12/1990 | European Pat. Off. . | |
| 2 333 534 | 1/1977 | France . | |
| 0 556 381 | 6/1985 | France . | |
| 1 817 624 | 5/1968 | Germany . | |
| 2 160 576 | 6/1973 | Germany . | |
| 25 22 864 | 12/1976 | Germany . | |
| 32 26 830 | 1/1984 | Germany . | |
| 33 13 329 | 10/1984 | Germany . | |
| 36 02 060 | 7/1987 | Germany . | |
| 37 03 866 | 8/1988 | Germany . | |
| 37 23 364 | 1/1989 | Germany . | |
| 195 21 944 | 12/1995 | Germany . | |
| 53-12742 | 6/1977 | Japan | E01C 13/00 |
| 59-151813 | 8/1984 | Japan . | |
| 4-24432 | of 1992 | Japan | A01G 1/00 |
| 4-24432 | 2/1992 | Japan . | |
| 59-151813 | 4/1992 | Japan | A01G 1/00 |
| 7-207614 | 8/1995 | Japan . | |
| 8-228512 | 9/1996 | Japan . | |
| 9-201127 | 8/1997 | Japan . | |
| 8500946 | 10/1986 | Netherlands . | |
| 486 766 | 7/1938 | United Kingdom . | |
| 2225240 | 5/1990 | United Kingdom . | |
| WO 92/05316 | 4/1992 | United Kingdom | E02D 17/20 |
| 92/07142 | 4/1992 | WIPO . | |
| PCT/GB91/ 01608 | 4/1992 | WIPO . | |
| 94 00639 | 1/1994 | WIPO . | |

OTHER PUBLICATIONS

"A Special Background Report on Trends in Industry and Finance," *The Wall Street Journal* (Jan. 26, 195).

"Fleeced Backing [THIOBAC 1 ANGELHAIR]for Sport Grass," product information facsimile from Bruijn, S.d. To Turf systems International, Inc., Oct. 31, 1996.

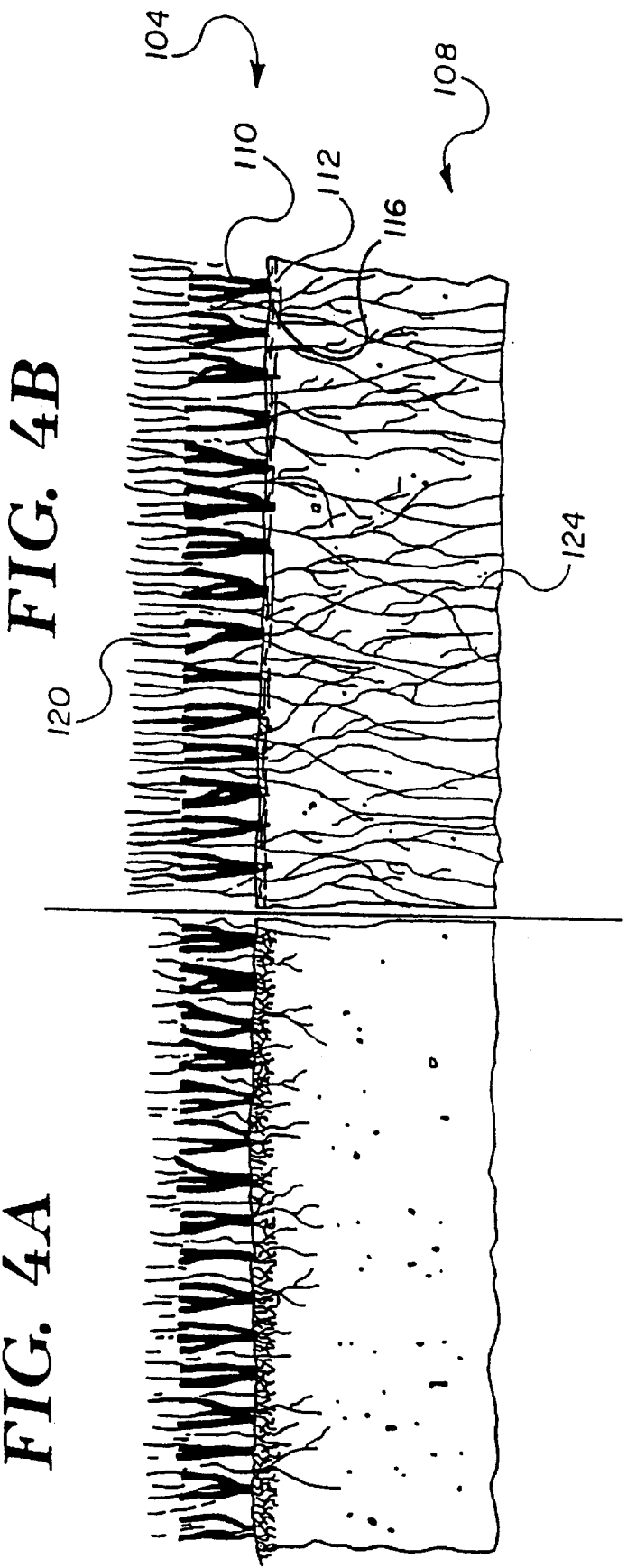

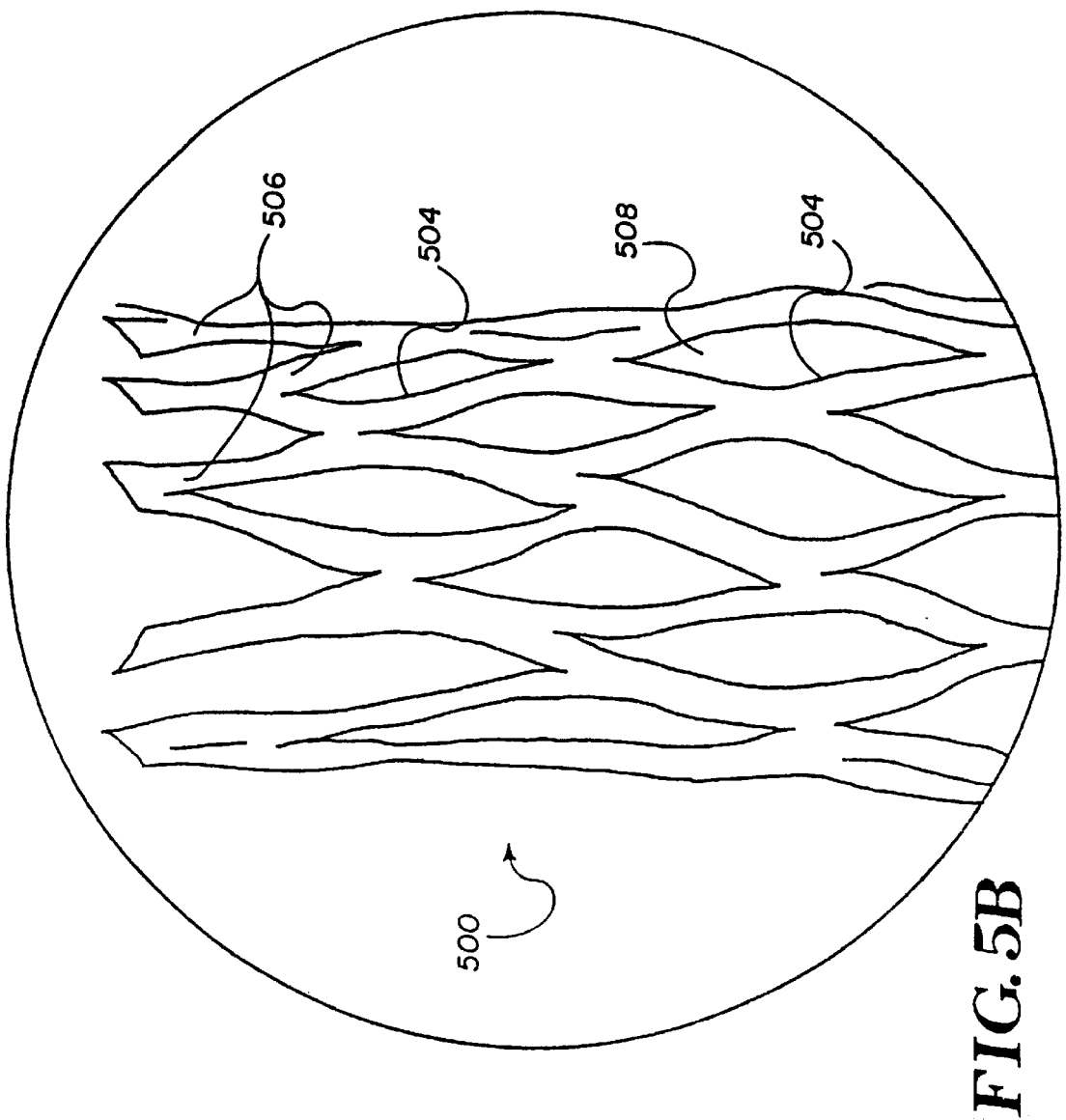
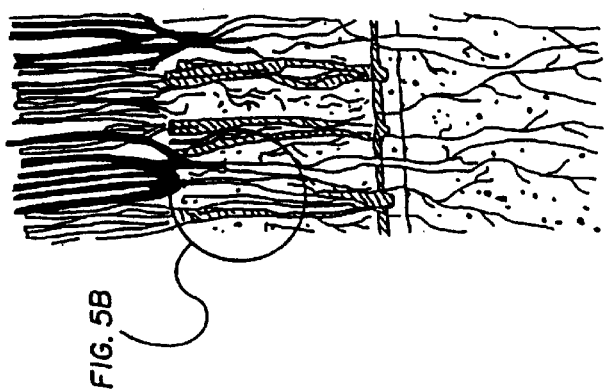
FIG. 5A
FIG. 5B

TYPICAL METHOD OF APPLICATION
(SHOWN USING OPTIONAL OVERLAPPING FABRIC)

SEEDED OR
SODDED PANELS

SPORTS PLAYING SURFACES WITH BIODEGRADABLE BACKINGS

CROSS-REFERENCE TO RELATED APPLICATIONS

This is a continuation of U.S. patent application Ser. No. 08/744,758 filed Nov. 6, 1996 now U.S. Pat No. 5,850,708, which is a continuation-in-part of U.S. patent application Ser. No. 08/334,414 filed Nov. 4, 1994, now U.S. Pat. No. 5,586,408, which is a continuation of U.S. patent application Ser. No. 08/078,624, filed Jun. 17, 1993, now abandoned, which is a continuation-in-part of U.S. patent application Ser. No. 07/902,147, filed Jun. 22, 1992, now abandoned, the disclosures of which are incorporated herein, in their entirety, by the foregoing reference thereto.

FIELD OF THE INVENTION

The present invention is directed to a biodegradable surface for sports and other uses and, more particularly, to a combination of artificial and natural surfaces supported by a biodegradable backing.

BACKGROUND OF THE INVENTION

For years natural turf surfaces were used for most outdoor sports, for example, soccer, football, field hockey, cricket, rugby, etc. Natural turf surfaces are surfaces constructed with a grass grown in soil, or some other surface layer of growth medium (e.g., sand and organic mixes, etc.), that is constructed upon a suitable foundation. A natural turf surface is generally preferred for its comfort, feel, grip, and appearance.

However, under heavy use and/or poor weather conditions, natural turf surfaces deteriorate rapidly and maintenance is costly. Intense activity on the turf destroys the grass and its root system, leaving mud and/or dirt on the playing surface. Prior to re-establishment of the turf, the surface is unsightly and often pockmarked, uneven, and possibly hazardous to use.

Another problem associated with natural turf surfaces is the use of painted-on yardage and boundary lines. Typically, such boundary lines are formed by painting the playing surface. For aesthetic reasons, such lines are generally painted just prior to each official game played on the playing surface. The repeated application of paint to the surface of the playing surface tends to kill the grass that is located under the painted surface. In addition, over time the multiple layers of paint build up, forming a surface that is substantially harder than the surrounding natural grass playing surface. Thus, the painted areas of the playing surface can create slippery spots within the playing surface, possibly leading to slips and falls by athletes using the playing surface. In addition, the painted areas can increase the possibility of injury to the athlete and create hard spots that can be uncomfortable or painful to an athlete who falls upon the painted area.

Due to the needs of sports programs, even after destruction of portions of the turf, play usually continues on the playing surface, even when the surface is badly damaged, until the sport's season is over, when the turf can be reestablished. Thus, the playing conditions on the playing surface continually decline over the season. At the end of the season, the natural turf surfaces are reseeded, the divots leveled and filled, etc. The natural turf surfaces are not usable during this reestablishment period because use defeats the reestablishment of the turf. The reestablishment period typically takes at least four months, or longer, under ideal weather conditions, during which the natural turf surface should not be used.

Recently, synthetic surfaces have been used as an alternative to natural turf surfaces. Synthetic surfaces generally come in two types, i.e., conventional and sand filled. Conventional synthetic is a dense synthetic material that has the appearance of dense grass blades. Sand-filled synthetic is a synthetic material similar to conventional synthetic turf, but with greater spacing between the blades, to accommodate a silica sand filling.

Both the conventional and sand-filled synthetics are placed indoors or outdoors, upon a foundation that may include an asphalt, concrete, wood, or other supporting subsurface along with cushioning mats, water drainage, and water irrigation.

Although synthetic turf surfaces are more durable than well-established natural turf surfaces, they are only moderately successful for sports and other uses. The most notable disadvantages of synthetic turf surfaces are the discomfort for the players and an increased number of injuries. Additionally, synthetic turf surfaces are generally expensive to put in place and have a life expectancy of 8 to 15 years, if properly maintained, and less if poorly maintained. Outdoor synthetic turf surfaces also remove large areas from the ecosystem, reducing natural processes including ground water recharge, oxygen and carbon monoxide balance, temperature modulation, and dust filtration. For these and other reasons, a number of synthetic turf surfaces are currently being converted back to natural turf surfaces.

As can be seen from the above discussion, there exists a need for an improved surface for sports and other uses, and a method of making the improved surface, wherein the surface provides improved comfort and fewer injuries to the users, while being durable under heavy use and in poor weather conditions. The present invention is directed to fulfilling this need.

SUMMARY OF THE INVENTION

The present invention provides an improved surface for sports fields and for other high-traffic uses. In one embodiment, the surface includes a foundation and a synthetic turf base that is positioned atop the foundation. The synthetic turf base is filled with a layer of growth medium, and includes synthetic fibers mounted in a permeable backing material. The backing includes a plurality of openings to allow water drainage and natural grass root growth therethrough. The synthetic fibers are constructed of a flexible, synthetic material and extend generally vertically upward from the backing material. Natural grass is planted in the growth medium so that the roots grow downward through the growth medium, through the backing material, and into the foundation. The blades of the grass grow upward from the top of the growth medium to form a playing surface.

In accordance with one aspect of the invention, the backing material is formed at least partially of a biodegradable material. In one embodiment, the biodegradable backing may be a woven material partially or completely formed of biodegradable strands. In another embodiment, the backing may be a mesh that is partially or completely formed of biodegradable material. The biodegradable backing degrades over time so as to increase the size and number of the openings through the backing to allow increasing growth of the roots of the natural grass into the foundation.

In accordance with other aspects of the invention, a mesh material is placed between the foundation and the synthetic turf base. The mesh material is located in the region of adjoining edges of the synthetic turf base and underlies the adjoining edges of the synthetic turf base. The roots of the grass plants grow through the synthetic turf base, through the mesh material, and into the foundation, thus binding different pieces of the synthetic turf base to the mesh material and the foundation. The mesh material can include protrusions extending from either one or both sides of the mesh material. The protrusions extend into the foundation and into the backing material in order to help anchor the edges of the synthetic turf base.

According to yet another aspect of the invention, the synthetic fibers are provided in two lengths: a first group of fibers having a first length and a second group of fibers having a second length that is shorter than the first length. The first group of fibers extends upward from the backing material a greater distance than the second group of fibers. A layer of growth medium is disposed in the synthetic turf base to a depth sufficient to substantially fill the synthetic turf base. In various embodiments, the layer of growth medium may be filled to a level that is below, at, or above the top of the first or second group of fibers.

In accordance with other aspects of the invention, the first group of fibers is uniformly interspersed throughout the playing surface. The first group of fibers extends upward and is intertwined with the natural grass blades. The first group of fibers protects the crowns and blades of the natural grass, while the second group of fibers protects the crowns of the grass plants.

In accordance with other features of the invention, the first group of fibers is formed of a color that contrasts with the grass and provides a visual indicator. The first group of fibers is placed in an organized pattern to provide boundary indicators, line indicators, etc. The backing material in the region of the first group of fibers is formed of a material that is root impervious. The backing material may also include an herbicide to prevent natural grass plants from growing into and through the backing material in the region of the first group of fibers.

The playing surface of the present invention improves the durability and visual appearance of natural grass playing surfaces. The playing surface of the invention helps to protect the crowns of the natural grass plants, thus helping to prevent damage to the natural grass. This allows the present invention to produce a playing surface that recovers more quickly than natural grass playing surfaces. At the same time, the playing surface of the present invention is formed substantially of natural grass blades, thus providing the comfort and appearance of a natural grass playing surface.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 4A and 4B are cross-sectional views illustrating chronological development of the surface of the invention;

FIGS. 5A and 5B are detailed illustrations of one embodiment of a synthetic grass fiber used in the invention;

DETAILED DESCRIPTION OF THE PREFERRED EMBODIMENT

Figures 1A, 1B:
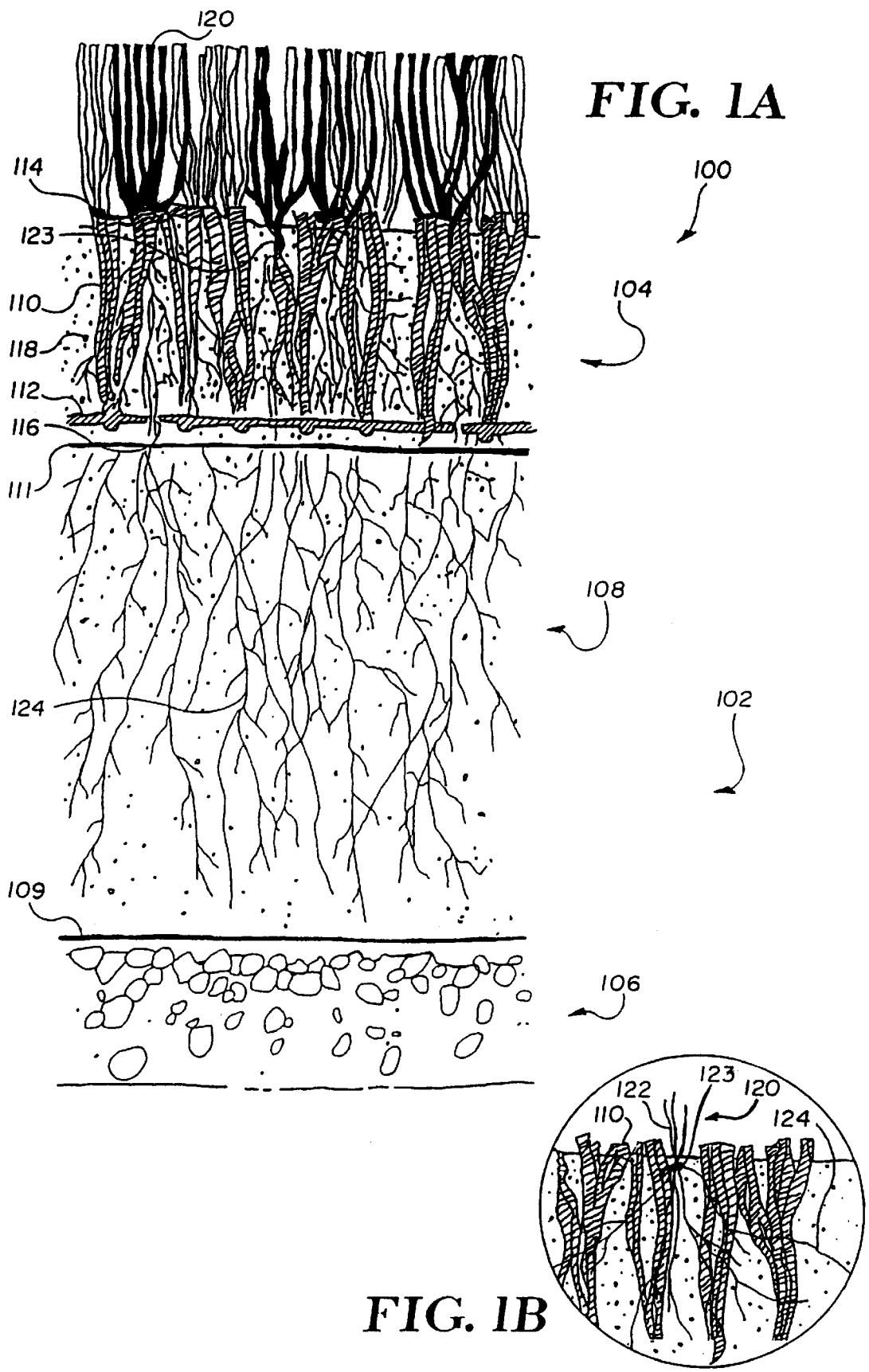
FIG. 1A is a cross-sectional view of an embodiment of an improved surface of the invention.
FIG. 1B is an enlarged cross-sectional view of a portion of the surface of FIG. 1A.

One embodiment of an improved surface 100 according to the invention is illustrated in FIGS. 1A and 1B. The improved surface 100 includes a foundation 102 upon which is mounted a synthetic turf base 104. The foundation 102 is constructed of a subgrade 106 and a subbase 108. The subgrade 106 is constructed for providing a structural base. The subgrade 106 may be formed of earth and rock existing on the site as is known in the art. Further, piping (not shown) may be placed in or on the subbase 108 to provide drainage and/or irrigation to the subbase 108. A subgrade for use with the invention may be readily provided by those skilled in the art.

The subbase 108 is positioned atop the subgrade 106 and is constructed, among other things, to provide sufficient drainage of water from the improved surface 100 to the subgrade 106. The subbase 108 is further constructed to provide structural support to the synthetic turf base 104 and a growth medium, as will be discussed more fully below. The subbase 108 may be constructed of any combination of materials known to those skilled in the art such as, for example, sand, rubber, rock, and other organic and/or inorganic materials. Like the subgrade 106, the subbase 108 may be readily constructed by those skilled in the art.

Figure 2:
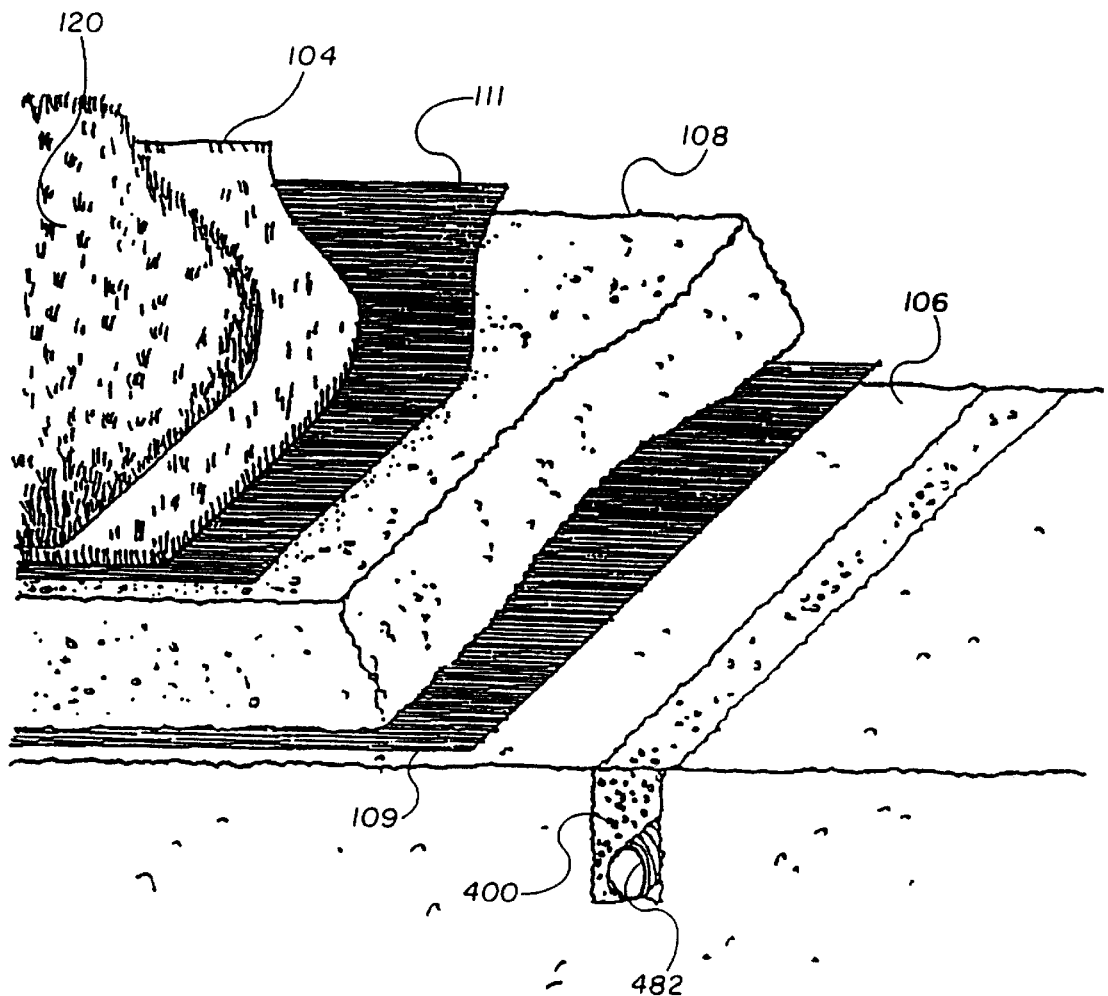
FIG. 2 is a partial cutaway view showing the construction of the surface of FIG. 1A.

Referring additionally to FIG. 2, a first filter (optional) 109 is positioned intermediate the subgrade 106 and the subbase 108 and a second filter (optional) 111 is positioned intermediate the synthetic turf base 104 and the subbase 108. The first and second filters 109 and 111 may each comprise a fabric or other material constructed to permit the flow of water from the synthetic turf base 104 to the subbase 108 and the subgrade 106, respectively. The first and second filters 109 and 111 are further constructed to restrict the flow of other substances (such as mud and other contaminants) between the synthetic turf base 104, the subbase 108, and the subgrade 106, i.e., to prevent such substances from moving downward or from migrating upward through the areas protected by the filters 109 and 111.

Adequate filters 109 and 111 may readily be selected by those skilled in the art. It will be apparent to those skilled in the art that either the first or the second perforated filter 109 or 111, or both, may be eliminated in some applications without departing from the spirit of the present invention.

The present invention is intended, among other uses, for use as a sports playing field, in which case the subbase 108 atop the subgrade 106 will most likely be desired to ensure adequate support and drainage to the improved surface 100. As will become apparent to those skilled in the art, the present invention is also suitable for use as other surfaces, such as, for example, fire access and parking medians, home yards, parks, and virtually anywhere that a natural or artificial turf surface is desired. In such applications, the subgrade 106 and subbase 108 may be modified to suit the particular use to which the invention is being put. In some applications, it may be desirable to eliminate the subbase 108 altogether. However it is generally desirable to provide some subbase 108 (or alternatively, a modified subgrade 106) upon which the synthetic turf base 104 can be supported.

Still referring to FIG. 1A, the synthetic turf base 104 is filled with a layer of growth medium 118, and includes a multiplicity of synthetic fibers 110 that are tufted, woven, or otherwise secured, to a flexible, porous backing 112. The backing 112 includes a plurality of openings 116. Natural grass 120 is planted in the growth medium 118 so that the roots grow downward through the growth medium, through the openings 116 of the backing material 112, and into the foundation 102. The blades of the grass grow upward from the top of the growth medium to form a playing surface.

Figure 3A:
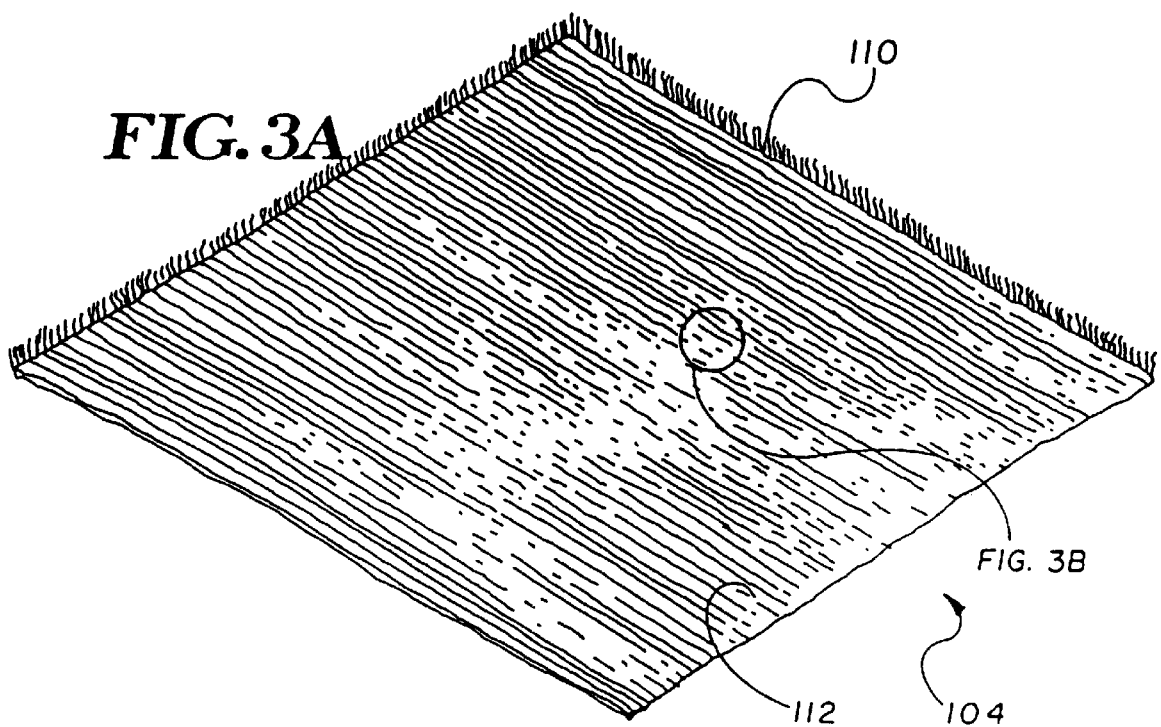
FIG. 3A is a perspective view of one backing material used in the invention.
Figure 3B:
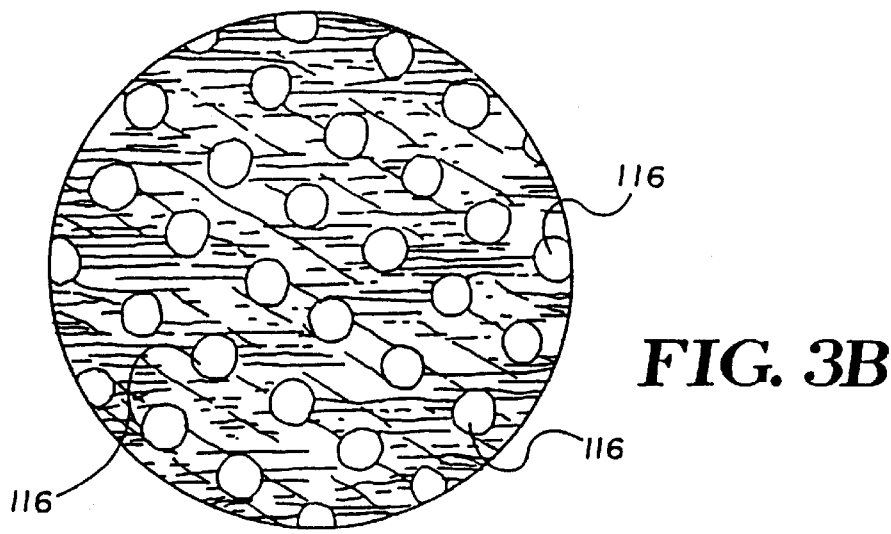
FIG. 3B is an enlarged view of a portion of the backing material of FIG. 3A.

In one embodiment, the synthetic turf base 104 is of a type similar to that used to form sand-filled synthetic turf surfaces. However, it is preferable that the backing 112 have a plurality of openings 116 to permit root growth and water drainage through the backing and into the foundation 102. FIGS. 3A and 3B illustrate one example of a perforated backing 112 having a plurality of openings 116. Alternatively, the backing 112 may be a woven material that is woven sufficiently coarse that the voids between the strands that form the backing form sufficient openings 116, as more fully described below. It is also preferable that the density of the synthetic fibers 110 be such as to allow a dense growth of natural grass 120 over the surface. As illustrated in FIGS. 4A and 4B, with sufficient openings 116 and appropriate density of the synthetic fibers 110, natural grass 120 grows upward while its roots 124 extend through the backing 112 into the ground.

The synthetic fibers 110 are constructed of a synthetic material that is substantially flexible. The synthetic fibers 110 each extend generally upward from one side of the flexible backing 112 and are generally perpendicular to the flexible backing 112. The synthetic grass fibers 110 are of sufficient length that the top portions 114 are spaced upward from the flexible backing 112.

In the embodiment illustrated in FIG. 1A, synthetic fibers that are approximately 28 millimeters in length and that have a density of approximately 12 synthetic fibers per 10 centimeters are preferred for some turf applications. However, longer or shorter fibers could be used with greater or lesser density depending on the contemplated use and site conditions. As an example, one alternative embodiment uses synthetic fibers that are 33 millimeters in length and have a density of 13 synthetic grass fibers per 10 centimeters, and another uses synthetic grass fibers that are 15 millimeters in length and have a density of 8 to 10 synthetic grass fibers per 10 centimeters.

As illustrated in FIGS. 5A and 5B, it is advantageous that the synthetic fiber 110 of the synthetic turf base 104 is partially slit, or "fibrillated," to include several blade openings 508 through each synthetic grass fiber. A synthetic fiber 500 in FIG. 5B is constructed from a substantially flexible material, for example, polyolefin or polypropylene. However, the flexible material may be constructed from any material commonly used in the art for making synthetic fibers. The flexible material is preferably extruded, or formed using any other technique known in the art, to construct a mesh or web-like structure. So constructed, the flexible material comprises a plurality of strands of material 504 positioned and secured to create a web that defines a plurality of openings 508. Those skilled in the art will appreciate that a synthetic fiber 500, such as the one illustrated in FIG. 5B, is referred to in the art as a fibrillated fiber. The fibrillated synthetic fiber 500 is preferred to further integrate the improved surface 100; the openings 508 in the synthetic fibers, together with the openings 116 in the backing 112, assist in binding the resulting improved surface 100 together by allowing synthetic fibers 110 and natural grass to intertwine with each other, as more fully described below.

Those skilled in the art will recognize that the construction of the synthetic turf base 104 may be further varied without departing from the present invention. As examples: the synthetic fibers 110 may be constructed or attached to the backing 112 so that the synthetic fibers are either "directional" or "nondirectional"; the openings in the synthetic fibers may be created by twisting several strands or fibers of material to provide a "twisted" synthetic fiber; the synthetic fibers can be constructed in a variety of arrangements, e.g., frizzed.

The flexible backing 112 is provided for positioning the synthetic fibers 110 during installation, and maintaining the synthetic fibers 110 in position during use of the improved surface 100. Further, the flexible backing 112 provides structural support to the improved surface 100 by distributing the force of impact upon the improved surface, thereby helping to prevent compaction of the subbase 108.

The flexible backing 112 includes a plurality of openings 116 through which grass roots and water may pass. The openings 116 may be holes punched or otherwise formed in the flexible backing 112, or may be provided to the flexible backing 112 by forming the same with a woven or mesh material, as more fully discussed below.

Figure 9:
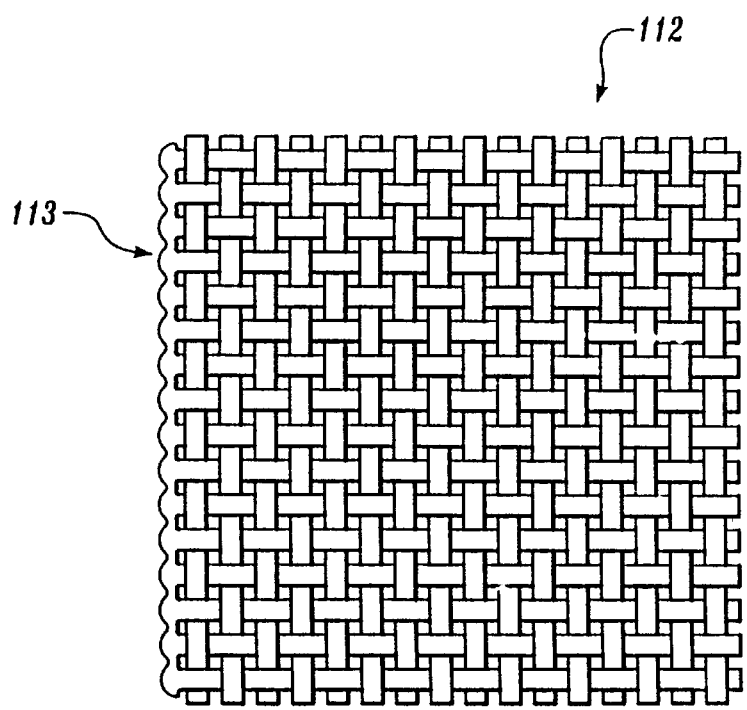
FIG. 9 is a top view of a backing material having a fused edge according to the present invention.

In one embodiment of the invention, the synthetic fibers 110 are tufted into a flexible backing 112 that is constructed from a woven fabric, as illustrated in FIG. 9. The backing is woven sufficiently coarsely that the voids between the strands that form the backing form openings that permit water drainage and root growth through the backing 112 and into the foundation 102.

Although woven materials allow roots to grow through the spaces between the individual woven fibers, it may be advantageous to form the backing from materials woven at least partially from biodegradable fibers. Using at least a portion of biodegradable fibers in the formation of the backing would allow such fibers to degrade over time, thus creating larger openings in the backing through which the roots could grow.

In one embodiment of the invention, the backing 112 is a mesh having the synthetic fibers 110 tufted into the backing. The backing may be formed of a nonbiodegradable material, or may be partially or completely formed of biodegradable material selected to deteriorate after installation, depending on the application, as discussed above with reference to a woven material.

As discussed above, it is important that the backing 112 support the synthetic fibers 110 during installation and also after installation until such time as the fibers 110 become completely supported by a dense growth of natural grass plants within the synthetic turf base. Therefore, in some embodiments, it may be advantageous to form the backing from woven fibers having varying degrees of biodegradability. For example, a first portion of the fibers can be formed of a material that biodegrades over a first period of time, a second portion of the fibers can be formed of a material that biodegrades over a second period of time, etc. Therefore, the backing 112 may be formed of biodegradable materials that allow a portion or all of the backing to biodegrade over an extended period of time. This construction allows the synthetic turf base to be fully supported by the growth of the natural grass plants, while still allowing the backing material to biodegrade, thus increasing the size and occurrence of openings through the backing to allow for a greater growth of the natural grass roots through the backing.

Examples of biodegradable material for use in this application include urea formaldehyde resin, although those skilled in the art will appreciate that other biodegradable materials could be substituted therefor without departing from the scope of the subject invention.

In order to assist in holding the weft and warp fibers in the backing together, and to help hold the synthetic fibers 110 secured to the backing in place, it is also advantageous to incorporate a fiber fleece into the backing material. The fiber fleece is placed against the underside of the backing material prior to the tufting of the synthetic fibers into the backing material. The fiber fleece is then preferably needle punched into the weft and warp fibers of the backing material, using a plurality of needles that punch up through the fleece and backing. The needle punching pushes part of the fleece through the weft and warp fibers of the backing, thus attaching the fleece and backing together. The synthetic fibers 110 are then tufted through the fleece and backing. The fleece helps to hold the synthetic fibers in place creating a "tuft lock" between the synthetic fibers and the backing. This tuft lock helps to prevent the synthetic fibers from falling out during transportation or installation of the turf.

In one embodiment, the fiber fleece is formed of a cellulosic biodegradable fiber having a weight of approximately one ounce per square meter. The use of a biodegradable fleece allows the fleece to degrade over time, thus allowing a more dense growth of the roots of the natural grass through the backing over time.

For ease of installation, it is advantageous that the backing be formed in such a way that it is flexible out of plane, but that it maintain its in-plane stability so that the orientation of the edges of the material will remain straight or otherwise fixed. Unfortunately, standard woven materials tend to have little in-plane stability and, thus, the woven materials allow in-plane slippage or movement, which allows the edges of the material to become distorted. Such distortions can make it difficult to carefully align adjoining edges of the backing material as they are placed down during installation. Therefore, it is advantageous to form the backing material with some in-plane reinforcement to assist it in maintaining its in-plane stability. One method of increasing the in-plane stability of the backing material is illustrated in FIG. 9.

As illustrated in FIG. 9, the edge 113 of the backing 112 is cut using a heated cutter that fuses the ends of the individual fibers forming the backing material together along the cut edge. Fusing the ends of the cut fibers of the backing material provides some in-plane rigidity to the woven backing 112. This in-plane stability in turn assists during installation by helping to maintain the edge 113 of the cut backing material in the predetermined cut shape. In addition, fusing the edges 113 of the backing material during cutting helps to prevent the synthetic fibers 110 that are tufted or otherwise fastened into the backing 112 from coming loose from the backing during installation. Various equipment can be used to form the fused cut edge 113, including heated cutting knives, laser cutters, etc.

The synthetic turf base 104 further includes a surface layer of growth medium 118 positioned atop the flexible backing 112, as more fully described below. In the embodiment of FIG. 1A, the surface layer of growth medium 118 fills the synthetic turf base 104 from the flexible backing 112 to a point proximate the top portions 114 of the synthetic fibers 110. However, after filling the synthetic turf base 104, the surface layer of growth medium 118 may settle slightly so that the top portions 114 of the synthetic fibers 110 extend slightly outward beyond the surface layer of growth medium 118.

The improved surface 100 further includes natural grass 120 that is planted in the surface layer of growth medium 118. The natural grass 120 includes a multiplicity of grass blades 122, each having a crown 123 (FIG. 1B) and roots 124 associated therewith. The natural grass 120 is planted in the surface layer of growth medium 118 so that the crowns 123 will be positioned just below the top of the surface layer of growth medium 118, as is known in the art. Preferably, natural grass seeds are sown in the surface layer of growth medium at a point where the crowns will be located after the seeds germinate and the surface is established. Generally, it is desirable to position the crowns 123 approximately one-eighth to one-quarter of one inch below the top of the surface layer of growth medium 118. However, those skilled in the art will appreciate that the crowns 123 may be positioned at varying distances from the top of the surface layer of growth medium depending upon a variety of factors, e.g., the type of natural grass 120 and the composition of the surface layer of growth medium 118.

Constructed in this manner, the synthetic fibers 110 surround the crowns 123 of the natural grass 120 to provide protection to the crowns 123, which is particularly advantageous during periods of heavy use and/or poor weather conditions. It will be appreciated by those skilled in the art that, in the embodiments of the invention discussed herein, the synthetic fibers 110 provide little protection to the grass blades 122. However, the present embodiments are intended to protect the crowns 123 and the roots 124 of the natural grass 120, thereby minimizing the time required for the grass blades 122 to regrow at times when the improved surface 100 is being reestablished, and also to provide a surface with a smoother, grass-like appearance that may be played on during reestablishment. The presence of the natural grass 120 gives the improved surface 100 the comfort, feel, grip, and appearance of a conventional natural turf surface, while the presence of the synthetic fibers 110 protects the crowns 123 and roots 124 to protect the improved surface 100 from deterioration.

Referring to FIGS. 1A, 1B, 5A, and 5A, the roots 124 of the natural grass 120 extend downward through the surface layer of growth medium 118, through the blade openings 508 of the synthetic blades 110, and through the openings 116 of the flexible backing 112. Providing blade openings 508 through which the roots 124 extend permits the roots 124 to assist in integrating the natural grass 120 with the surface layer of growth medium 118 and the synthetic grass fibers 110. Providing backing openings 116 through which the roots 124 can extend permits the roots 124 to assist in integrating the synthetic turf base 104 with the foundation 102. It is desirable, therefore, to provide blade openings 508 and backing openings 116 adequate in size and number to permit the roots 124 to penetrate from the surface layer of growth medium 118 to the subbase 108.

One method of providing blade openings 508 of adequate size and number is to provide synthetic grass fibers 500 with a web 506, as discussed above by reference to FIG. 5B. After the roots 124 have grown through the blade openings 508 of the synthetic grass fibers 500, the roots 124 will assist in maintaining the synthetic grass fibers 500 in position, thereby integrating the synthetic turf base 104. Other methods for providing blade openings of sufficient size and number to permit the roots 124 to integrate the synthetic turf base will be apparent to those skilled in the art.

One method of providing backing openings 116 of adequate size and number is to form the backing from another material, such as woven or mesh material. The size and number of openings can also be increased by using biodegradable fibers to form such material so that, after the biodegradable fibers have deteriorated, the size and numbers of openings in the backing will increase to permit additional penetration of the roots 124 from the surface layer of growth medium 118 to the subbase 108. Those skilled in the art will appreciate that, by permitting the roots 124 to penetrate the backing openings 116 of the flexible backing 112, the roots 124 will provide integration of the synthetic turf base 104 to the subbase 108 beyond any conventional method for fixing the synthetic turf base 104 to the subbase 108. The roots 124 will interact with the openings to firmly fix the synthetic turf base 104 to the subbase 108, thereby preventing any movement of the turf base 104 across the subbase 108 or lifting of the turf base 104 at the edges.

The surface layer of growth medium 118 may comprise a variety of materials for supporting the natural grass 120. In one embodiment of the invention, the surface layer of growth medium 118 is a mixture of sand and rubber particles. However, it will be apparent to those skilled in the art that the surface layer of growth medium may comprise a variety of materials for supporting the natural grass 120. Further, it is desirable to provide the surface layer of growth medium 118 in sufficient quantity to assist in stabilizing the synthetic turf base 104 and the synthetic grass blades 110. Providing approximately five pounds of growth medium for each square foot of the improved surface 100 has been found satisfactory for this purpose. However, more or less material may be provided in different applications. Also, it is desired to provide the surface layer of growth medium 118 in sufficient quantity to extend from about one-half inch to one inch from the flexible backing 112, to provide a sufficient growing medium for the roots 124 of the natural grass 120 above the flexible backing 112.

Due to the improved construction of the synthetic turf base 104 in combination with the natural grass 120, the selection of adequate materials for the surface layer of growth medium 118 is not as limited as with sand-filled synthetic turf surfaces. As an example, it is generally accepted that only rounded silica sand, a somewhat scarce and expensive sand, is suited for use with sand-filled synthetic turf surfaces. This is because regular sand is abrasive against the synthetic grass blades, and also because it tends to compact, reducing surface drainage and creating a hard surface that is less comfortable for the user. However, in the invention, the roots 124 of the natural grass 120 hold the surface layer of growth medium 118 in place, and, thus, regular sand may be used without increasing abrasion against the synthetic grass blades 110. Furthermore, since the roots 124 of the natural grass 120 provide some resiliency to movement in the synthetic turf base 104, compaction is reduced. Still further, the grass blades 122 of the natural grass 120 protect the user from abrasion against the surface layer of growth medium 118.

Although in some applications it is desirable to mix rubber or other cushioning particles with the sand, it is generally accepted that rubber particles cannot be mixed with silica sand (and to some extent also, regular sand). This is because water and agitation of the sand will tend to separate the rubber particles from the sand, bringing the rubber particles to the top. However, due to the tendency of the roots 124 of the present invention to hold the surface layer of growth medium 118 in place, rubber particles may be mixed with the surface layer of growth medium 118 to thereby provide a more comfortable playing surface. Also, the addition of rubber particles to the surface layer of growth medium results in less compaction and, therefore, less mechanical aeration of the surface is required as part of a maintenance program.

In some applications where natural grass characteristics are desired, it is advantageous that the top portions 114 do not extend substantially beyond the surface layer of growth medium 118. In such applications, the synthetic fibers protect the crowns 123 and roots 124 of the natural grass. Since the root system of the natural grass 120 is protected by the synthetic blades, even when the blades 122 of the natural grass 120 are destroyed during play, they regrow quickly without the maintenance required for fully natural surfaces; replanting may not be required since the established roots 124 and crowns 123 will regenerate new blades 122.

Another advantage of the invention is that the grass blades 122 of the natural grass 120 shield sunlight from the synthetic fibers 110 of the synthetic turf base 104, substantially reducing the breakdown of the synthetic fibers 110 due to ultraviolet light. Further, the incorporation of the natural grass 120 with the synthetic turf base 104 reduces wear of the synthetic turf base 104, since the roots 124 of the natural grass 120 reduce the grinding action of the sand on the synthetic turf. This reduction in wear and ultraviolet light breakdown increases the expected life of the improved surface 100, thereby reducing the long-term cost of the surface.

Referring to FIG. 2, a description of a method of constructing one embodiment of an improved surface 100 according to the invention is described. Initially, the subgrade 106 is prepared by forming trenches 400 and adding drainage piping 482. Thereafter, the first perforated filter 109 is added atop the subgrade 106, if desired, and is followed by formation of the subbase 108. If the second perforated filter 111 is desired, it is placed upon the subbase 108 followed by the synthetic turf base 104, including a surface layer of growth medium 118. It should be noted that the filters 109 and 111 are not considered to be within the scope of the invention. Those skilled in the art will readily appreciate that the filters 109 and 111 are optional and one or the other or both may be omitted, depending upon the application. After the synthetic turf base 104 has been installed, the natural grass 120 (FIG. 1A) is planted so that the crowns 123 and roots 124 can form, as described above.

As mentioned above, the subbase 108 is constructed to provide structural support to the synthetic turf base 104, as with conventional or sand-filled synthetic turf. Unlike conventional or sand-filled synthetic turf, however, the subbase 108 is further constructed to provide a growing medium for the roots 124 of the natural grass 120.

One advantageous way of installing the improved surface 100 is to fabricate panels of sod that have been preplanted with natural grass as described above. The synthetic turf base may be manufactured in panels of a size readily stored, transported, and installed, e.g., of approximately 16 inches by 48 inches. The synthetic turf base may also be fabricated at a sod farm, cut, rolled, transported to site, and installed. During manufacturing, the synthetic turf base is filled with a surface layer of growth medium that is seeded, sprigged, or sodded to create a preplanted panel.

Preferably, in the case of preplanted panels, the panels are manufactured by combining a binding material with the surface layer of growth medium to stabilize the components of the preplanted panel during manufacture, transportation, and installation. Preferably, the binding material is selected as a material that can be readily decomposed after the preplanted panels are installed, as more fully discussed below. A presently preferred binding material that may be used is a biodegradable material. Other binding materials, such as degradable materials, may also be used, as will become apparent to those skilled in the art.

The manufacture of the preplanted panel may involve combining the binding material with the surface layer of growth medium in a variety of ways. As an example, the binding material may be combined with the surface layer of growth medium in a substantially dry form, combined with a sufficient amount of water or other activating agent, and dried to create a substantially cohesive structure. As an alternative, the surface layer of growth medium may be combined with a binding material in a substantially liquid form, and thereafter dried to create a substantially cohesive structure.

In either method, it is desired to initially provide only such an amount of surface layer of growth medium as to fill between the backing of the synthetic turf base and where the natural grass seeds are to be planted. To complete the manufacture of the preplanted panel, the natural grass seeds are provided and the additional amount of surface layer of growth medium is added to fill between where the seeds are planted and the top of the preplanted panel. The additional amount of surface layer of growth medium may be stabilized with a binding material, as described above. Thus produced, the preplanted panels may be readily stacked and/or otherwise stored, prior to shipping and installation. Those skilled in the art can readily identify favorable storage conditions.

The preplanted panels constructed in this manner may be produced in a controlled production environment, thereby assuring a consistently high quality of product in accordance with the exact specification of ingredients required for each application. With use of the preplanted panels, various steps required to build the improved surface at a site may be completed in a controlled production environment, thereby greatly reducing installation time on site. Additionally, each preplanted panel can be manufactured substantially identical with each other and, therefore, the installed surface will not be subject to variation between local installers, local materials, and weather conditions. Another advantage is that the preplanted panels may be installed under most weather conditions. The preplanted panels also achieve considerable cost saving in the handling and installation of the material.

Figure 7A:
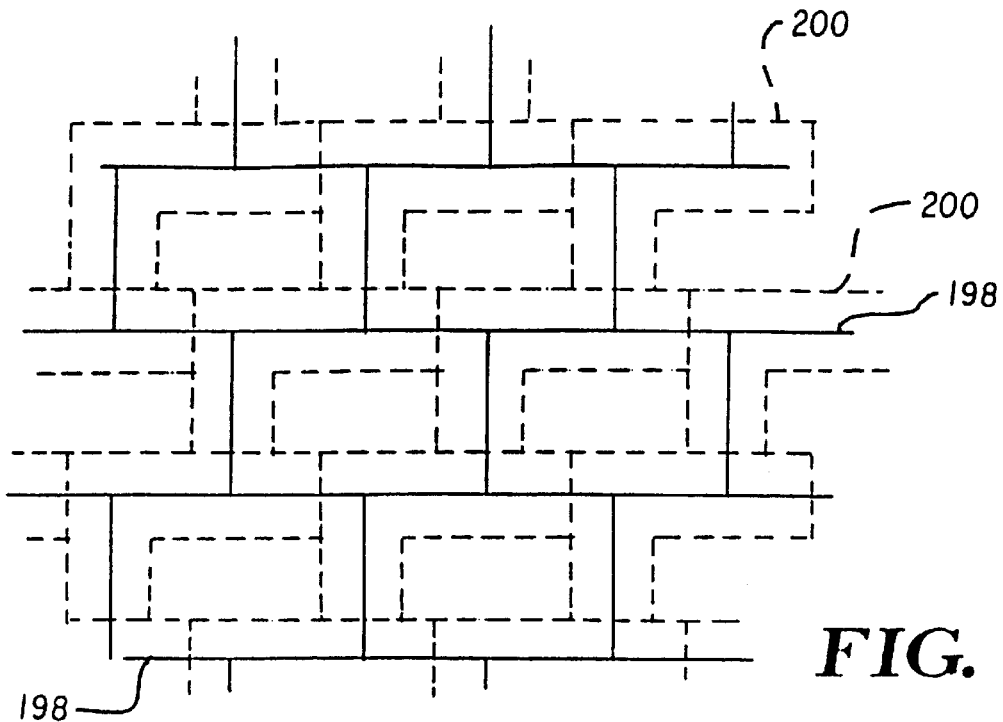
FIGS. 7A and 7B are illustrations of seeded panels during installation according to the invention.
Figure 7B:
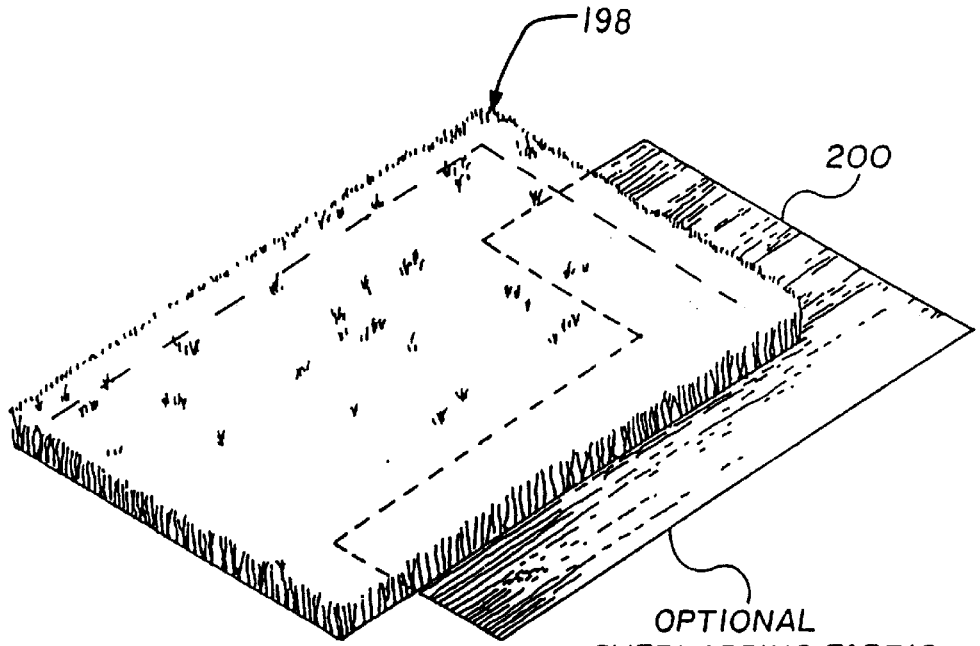

Referring to FIGS. 7A and 7B, in installing a synthetic turf base in the form of a preplanted panel, it is desirable to reinforce the edges of the panels 198 of the synthetic turf base. In the embodiment illustrated in FIGS. 7A and 7B, the edges between the various panels 198 are reinforced by first applying a mesh-type material 200 upon the foundation prior to placing the panels 198. Also as illustrated in FIGS. 7A and 7B, each mesh-type material 200 is provided in an L shape such that the mesh-type materials fit together to underlie all the edges of the adjoining panels 198. The mesh-type material 200 is provided so that the roots of the natural grass plants grow through the panels 198, down through the mesh-type material 200, and into the underlying foundation. Thus, the roots of the natural grass plants interlock the edges of the panels 198 with the mesh-type material 200 and the underlying foundation. This interlocking helps to ensure that the edges of the panels 198 are efficiently and reliably joined together to prevent possible movement of one panel with respect to another or possible lifting of the edges of the panels. It should be understood that the mesh-type material 200 may also be applied in reinforcing the edges of the adjoining synthetic turf bases that are constructed without using preplanted panels.

Figures 8A, 8B:
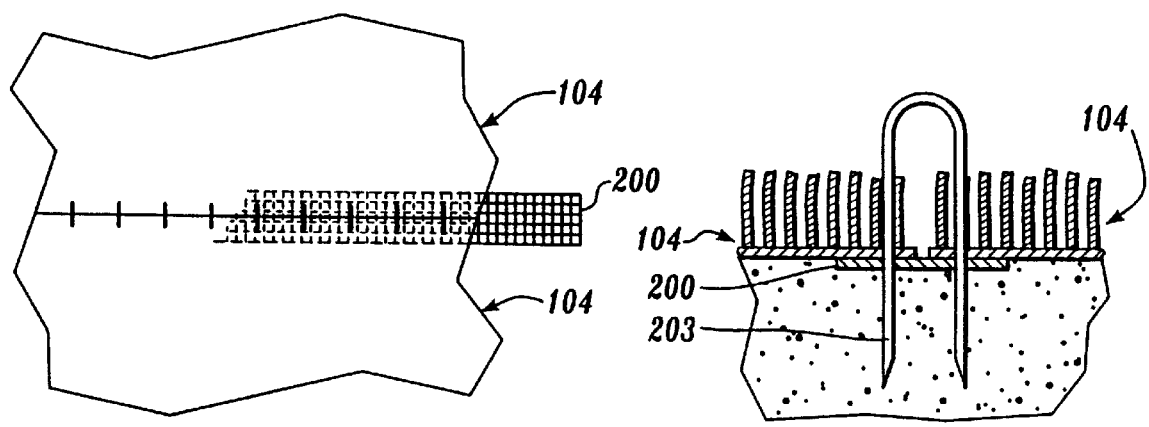
FIGS. 8A and 8B are a plan view and a cross-sectional view, respectively, of a portion of the installation of one embodiment of the invention.

FIGS. 8A and 8B illustrate a second embodiment of a mesh-type material that may be used to reinforce the edges of the adjoining synthetic turf bases 104. As illustrated in FIGS. 8A and 8B, the mesh-type material 200 is placed underneath the adjoining edges of two synthetic turf base pieces. In the embodiment illustrated in FIGS. 8A and 8B, the mesh-type material 200 is shown in the form of a long narrow strip that is used to install long, large adjoining pieces of synthetic turf base 104. However, a narrow strip of mesh-type material 200 such as that shown in FIGS. 8A and 8B could also be utilized in the installation of preplanted panels 198, such as those shown in FIGS. 7A and 7B, in place of the L-shaped mesh material.

The mesh-type material 200 illustrated in FIGS. 8A and 8B is installed underneath the edges of the two adjoining synthetic turf base pieces 104. In order to further ensure that the edges of the synthetic turf base pieces do not shift or become otherwise displaced during completion of the installation, it is desirable to anchor the edges of the synthetic turf base pieces and mesh-type material 200. In the embodiment illustrated in FIGS. 8A and 8B, U-shaped anchors 203 are inserted into the installed synthetic turf base 104 such that the opposing points of the U-shaped anchors extend through the opposing edges of the synthetic turf base pieces, through the mesh-type material 200, and into the underlying foundation. The U-shaped anchors 203 are left in position during the subsequent filling of the synthetic turf base with a growth medium, and then removed prior to seeding.

Figure 11:
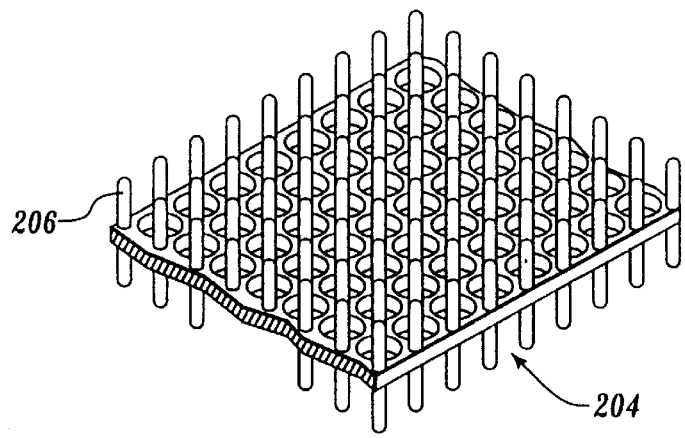
FIGS. 11 and 12 are a perspective view and a cross-sectional view, respectively, of an alternate embodiment of a portion of the installation of one embodiment of the invention.
Figure 12:
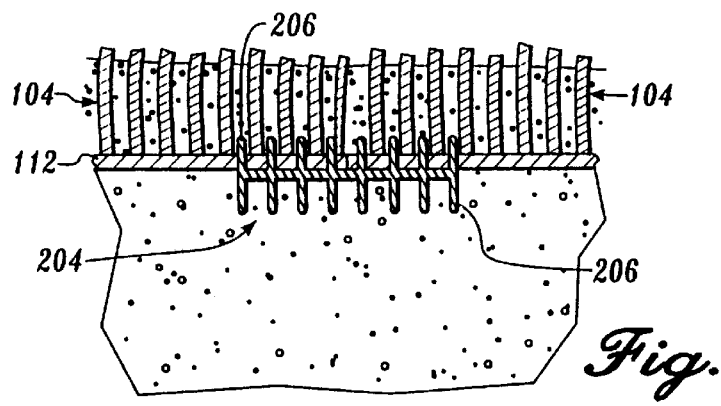

Another embodiment of a mesh-type material 204 is illustrated in FIGS. 11 and 12. The mesh-type material 204 illustrated in FIGS. 11 and 12 is fabricated from a fiberglass, nylon, knitted or woven polymer, or other material. The mesh-type material 204 includes a plurality of spikes or other protrusions 206 that extend either upward from the upper surface of the material, downward from the lower surface of the material, or both upward and downward from the upper and lower surfaces of the material, respectively, depending on the application. The area between the protrusions 206 is left open to allow the roots of the natural grass plants to grow through the mesh-type material 204, as discussed above.

As illustrated in FIG. 12, when installed, the protrusions 206 extend downward into the foundation and upward through the backing material 112 of the synthetic turf base 104. The protrusions 206 thus help to anchor the mesh-type material 204 in the proper position on the foundation and also help the mesh-type material 204 to engage and stabilize the edges of the synthetic turf base 104. The embodiment illustrated in FIGS. 11 and 12 may provide additional stability to the installation during subsequent filling of the synthetic turf base 104 with growth medium and planting of natural grass. In addition, the embodiment of the mesh-type material 204 may also help to eliminate the need for the use of the U-shaped anchors 203 discussed above in reference to FIGS. 8A and 8B.

Figure 6:
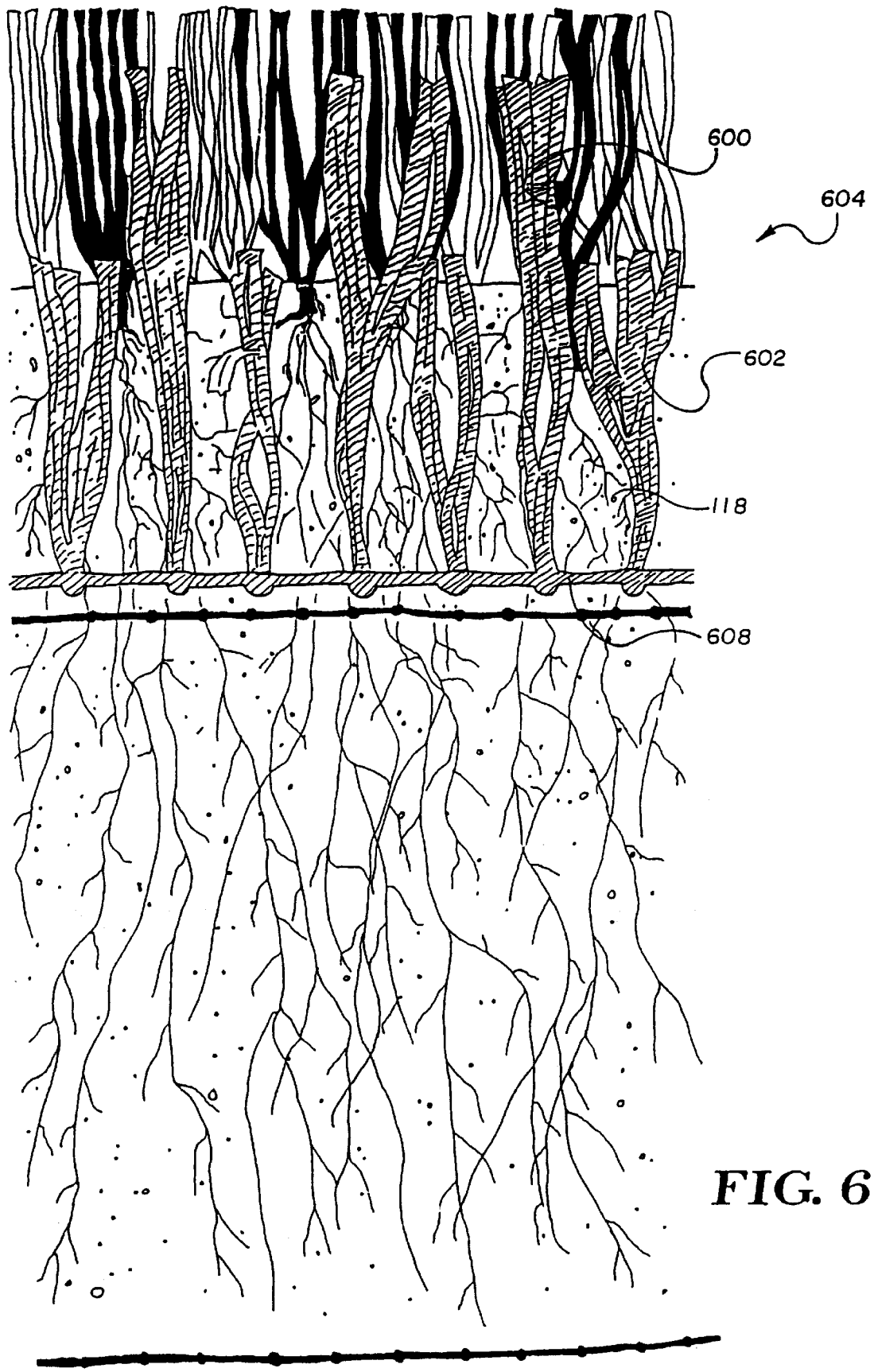
FIG. 6 is a cross-sectional view of another embodiment of the invention, illustrating synthetic fibers having varying lengths.

Referring to FIG. 6, in another embodiment of the invention, the synthetic grass fibers 600 and 602 are constructed from synthetic grass fibers having varying lengths. An improved surface 604 is constructed from synthetic fibers 600 having a first length and synthetic fibers 602 having a second length secured to a flexible backing 608. As illustrated in FIG. 6, the length of the fibers 600 having a first length is greater than the length of the second fibers 602 having a second length, so that the longer synthetic fibers 600 extend outward from the flexible backing 608 a greater distance than do the shorter synthetic fibers 602.

The alternate improved surface 604 provides improved characteristics for selected applications. As one example, the improved surface 604 is particularly suited for use as the driving portion of a golf tee because the longer synthetic grass fibers 600 provide greater resistance to golf clubs and, thus, more uniform appearance after each use. Furthermore, the longer fibers 600 support the golf balls above the top of the improved surface 604, thereby decreasing the damage to the remainder of the improved surface 604. As another example, a selected portion of the longer synthetic fibers 600 may be provided in a predetermined color for marking lines, logos, etc., as more fully described below. Those skilled in the art will appreciate that the synthetic grass fibers of the subject invention may be constructed from a variety of lengths to provide different characteristics to the improved surface, and that two or more different lengths could be used in the same application.

As most clearly illustrated in FIG. 6, it is sometimes desirable to permit at least a portion of the synthetic fibers to extend outward beyond the surface layer of growth medium 118. This can provide additional protection to the crown, roots, and blades of the natural grass 120, thereby possibly improving the durability of the natural grass. The characteristics of the resulting improved surface 604, or 104 in FIG. 1A, can be varied by varying the length and density of the top portions 114 of the synthetic fibers that are to be exposed. Further, at times when the blades of the natural grass 120 are worn short, exposed portions of the synthetic grass fibers may help not only to protect the crowns, roots, and blades of the natural grass 120, but also to provide a visually pleasing surface.

Figure 10:
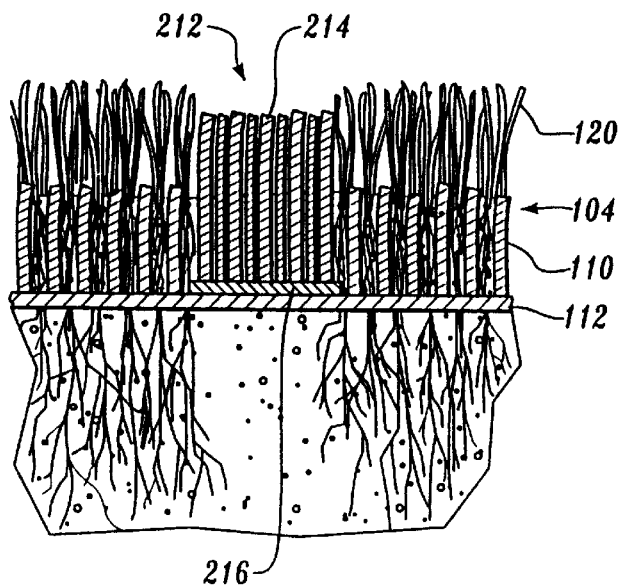
FIG. 10 is a cross-sectional view of another embodiment of the invention incorporating a built-in line indicator.

As discussed briefly in the Background section, one of the problems associated with prior playing surfaces used for football, soccer, and some other sports is the application of boundary indicators such as boundary lines and yardage lines. FIG. 10 illustrates an embodiment of the invention that incorporates built-in boundary indicators that help to eliminate the problems associated with prior boundary indicators. As illustrated and discussed above, the synthetic turf base 104 includes a porous backing 112 and a plurality of upwardly extending synthetic grass fibers 110. In the embodiment illustrated in FIG. 10, the synthetic turf base 104 includes an indicator portion 212 that is configured to provide boundary indications, line indications, etc. In this embodiment, the indicator portion 212 is formed by forming a portion of the synthetic turf base 104 without any synthetic turf fibers 110. The indicator portion 212 is then formed separately by tufting synthetic indicator fibers 214 into an indicator backing material 216.

Unlike the synthetic turf base 104, it is advantageous to form the indicator backing material 216 from a material that is impervious to the root growth of natural grass plants to help prevent grass from growing through the indicator portion. It is also advantageous to form the synthetic fibers 214 to extend upwardly from the surface of the indicator backing material 216 by such a length that the tops of the indicator fibers 214 are at approximately the same height as the top of the mowed natural grass blades 120 growing in the synthetic turf base 104.

In some applications, it is also advantageous to form the indicator portion 212 with a much more dense distribution of synthetic fibers 214 than that used in the surrounding synthetic turf base 104. Forming the indicator portion 212 with a sufficiently dense distribution of synthetic fibers 214 helps to prevent the natural grass from growing into or otherwise becoming part of the indicator portion 212. It is also advantageous to include a type of herbicide in the indicator backing material 216 to prevent natural grass from growing into the indicator portion 212. It is further advantageous to form the imitation fibers 214 of a color that contrasts with the natural color of the grass so that the indicator portion 212 can be easily observed by players and onlookers.

The indicator portion 212 may be attached to the backing material 112 by applying an adhesive between the indicator backing material 216 and the backing material 112. Alternatively, the indicator portion 212 may be sewn or otherwise attached to the backing material 112. In yet other embodiments, the synthetic fibers 214 may be tufted directly into the backing material 112. However, in such applications it is advantageous that the backing material 112 in the region of the indicator portion 212 be coated with an impervious material either before or after the tufting of the synthetic fibers 214 to prevent grass growth through the backing material 112 in the region of the indicator portion 212.

In addition to forming boundary lines, etc., as described above, graphical indicators such as high school or college logos, names, and the like, may also be formed in the synthetic turf base 104 in a manner similar to that described above with respect to the indicator portion 212.

Forming the indicators such as boundary lines, etc., through the use of longer synthetic fibers 214 having different colors or density, reduces several of the problems associated with prior art playing surfaces. For example, indicators formed in accordance with the invention provide a long-term indication and require minimal, if any, maintenance. In addition, such indicators do not provide a slippery or hard surface as produced by repeatedly painting indicators directly upon an artificial or natural playing surface.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A playing surface comprising:
    (a) a foundation;
    (b) a synthetic grass turf located on top of the foundation comprising a single backing partially but not entirely formed of a biodegradable material, and a plurality of generally upright fibers mounted in the backing;
    (c) a layer of growth medium disposed on top of the backing of the synthetic turf to at least partially fill the fibers; and
    (d) natural grass plants having grass blades, crowns disposed within the layer of growth medium, and roots disposed in the growth medium, the roots extending downward through the growth medium while intertwining with the fibers, extending through the backing, and into the foundation, and the blades extending upward above the top of the layer of growth medium to form a playing surface, whereby a non-biodegradable portion of the backing maintains the fibers in place during use, so that the single backing initially has optimum structural integrity to facilitate handling during installation but after installation becomes more root permeable to facilitate root growth therethrough.

2. The playing surface of claim 1, wherein the backing comprises a secondary, and the secondary comprises urea formaldehyde resin.

3. The playing surface of claim 1, wherein the backing is formed of two different biodegradable materials which biodegrade at different rates.

4. The playing surface of claim 1, wherein the backing is woven from a first group of fibers which are biodegradable and at least one other group of fibers which are not biodegradable, the at least one other group of fibers comprising the non-biodegradable portion of the backing.

5. The playing surface of claim 4, which further comprises biodegradable fiber fleece applied to the underside of the woven backing material.

6. The playing surface of claim 5, wherein the biodegradable fiber fleece comprises biodegradable cellulose fibers.

7. The playing surface of claim 1, wherein the backing comprises a mesh material that is partially but not entirely formed of biodegradable fibers.

8. The playing surface of claim 1, wherein the single backing comprises different biodegradable materials that degrade at different rates to produce a greater degree of porosity in the backing over time.

9. The playing surface of claim 1, wherein the backing comprises a fabric.

10. The playing surface of claim 1, wherein the synthetic fibers comprise fibers each having at least one aperture defined therethrough so as to allow the natural grass roots to pass through.

11. A playing surface comprising:
(a) a foundation;
(b) a synthetic grass turf located on top of the foundation comprising a single backing partially but not entirely formed of a biodegradable material, and a plurality of generally upright fibers mounted in the backing;
(c) a layer of growth medium disposed on top of the backing of the synthetic turf to at least partially fill the fibers; and
(d) natural grass plants having grass blades, crowns, and roots disposed in the growth medium, the blades extending upward above the top of the layer of growth medium to form a playing surface, and the roots extending downward through the growth medium while intertwining with the fibers, extending through the backing, and into the foundation wherein the biodegradable material of the backing is selected to decompose after a predetermined period of time and whereby a non-biodegradable portion of the backing maintains the fibers in place during use, so that the single backing initially has optimum structural integrity to facilitate handling during installation but after installation becomes more root permeable to facilitate root growth therethrough.

12. A playing surface comprising:
(a) a foundation;
(b) a synthetic grass turf located on top of the foundation comprising a single woven backing which is partially but not entirely formed of a biodegradable fabric, and a plurality of generally upright fibers mounted in the backing;
(c) a layer of growth medium disposed on top of the backing of the synthetic turf to at least partially fill the fibers; and
(d) natural grass plants having grass blades, crowns, and roots disposed in the growth medium, the roots extending downward through the growth medium while intertwining with the fibers, extending through the backing, and into the foundation, and the blades extending upward above the top of the layer of growth medium to form a playing surface, whereby a non-biodegradable portion of the backing maintains the fibers in place during use, so that the single backing initially has optimum structural integrity to facilitate handling during installation but after installation becomes more root permeable to facilitate root growth therethrough.

13. A method of forming a playing surface, comprising:
(a) providing a foundation;
(b) placing a synthetic turf on top of the foundation, the synthetic turf comprising a single backing which is partially but not entirely formed of a biodegradable material and a plurality of generally upright fibers mounted in the backing;
(c) applying a layer of growth medium on top of the backing of the synthetic turf to at least partially fill the fibers;
(d) sowing grass on top of the growth medium; and
(e) growing natural grass plants within the layer of growth medium, the natural grass plants having grass blades, crowns, and roots disposed in the growth medium, the roots extending downward through the growth medium while intertwining with the fibers throughout the length of the synthetic fibers, extending through the backing, and into the foundation, and the blades extending upward above the top of the layer of growth medium to form a playing surface, whereby a non-biodegradable portion of the backing maintains the fibers in place during use, so that the single backing initially has optimum structural integrity to facilitate handling during installation but after installation becomes more root permeable to facilitate root growth therethrough.

14. The method of claim 13 and further comprising:
applying another layer of growth media after the sowing of grass.

15. A playing surface comprising:
(a) a foundation;
(b) a synthetic grass turf located on top of the foundation comprising a backing having a primary and a non-latex secondary, the non-latex secondary being biodegradable after installation and including urea formaldehyde, and a plurality of fibers mounted to the backing;
(c) a layer of growth medium disposed on top of the backing of the synthetic turf to at least partially fill the fibers; and
(d) natural grass plants having grass blades, crowns disposed within the layer of growth medium, and roots disposed in the growth medium, the roots extending downward through the growth medium while intertwining with the synthetic fibers, extending through the backing, and into the foundation, and the blades extending upward above the top of the layer of growth medium to form a playing surface, whereby the non-latex secondary degrades after installation to enhance the root permeability and the water permeability of the backing.

* * * * *